United States Patent [19]

Giles

[11] Patent Number: 4,966,184

[45] Date of Patent: Oct. 30, 1990

[54] SYSTEM TO AVOID ICING IN THE DISCHARGE PIPING OF A PRESSURE RELIEF VALVE

[75] Inventor: Gary J. Giles, Pineville, La.

[73] Assignee: Dresser Industries, Inc., Dallas, Tex.

[21] Appl. No.: 400,196

[22] Filed: Aug. 29, 1989

Related U.S. Application Data

[62] Division of Ser. No. 267,416, Nov. 4, 1988, abandoned.

[51] Int. Cl.$^5$ ............................................... B01F 3/00
[52] U.S. Cl. .................................................... 137/205.5
[58] Field of Search ........................... 137/205.5, 564.5; 239/310

[56] References Cited

U.S. PATENT DOCUMENTS

| | | | |
|---|---|---|---|
| 1,171,014 | 2/1916 | Anger et al. | 137/70 |
| 1,220,336 | 3/1917 | Hornsby | |
| 1,336,905 | 4/1920 | Hunzicker | |
| 1,884,092 | 10/1932 | Minier | |
| 2,058,309 | 10/1936 | Haering | 137/205.5 |
| 2,323,341 | 7/1943 | McGill | 137/564.5 X |
| 2,693,351 | 11/1954 | Riley et al. | 261/119 |
| 2,733,733 | 2/1956 | Ghormley | 138/34 |
| 4,846,214 | 7/1989 | Strong | 137/205.5 |

FOREIGN PATENT DOCUMENTS 1708628  2/1968  Fed. Rep. of Germany ... 137/205.5

*Primary Examiner*—Alan Cohan

[57] ABSTRACT

Apparatus for deicing the discharge gas from a safety relief valve includes a high pressure probe and an injection probe extending into the flow path of the discharge gas. Inlet orifices in the high pressure probe include inlet orifices facing directly upstream relative to the gas for communication of the total pressure of the flowing gas to the inside of a reservoir containing the deicing agent. The injection probe connects with an outlet of the reservoir and includes outlet orifices facing directly downstream of the discharge gas flow so that the reservoir is subjected to a driving pressure derived from the difference between the total pressure of the flowing gas and its reverse dynamic pressure. An adjustable connector mounting the high pressure probe in the discharge flow path of the gas allows the inlet orifices to be selectively oriented between positions facing directly upstream and perpendicular thereto to selectively vary the driving pressure.

7 Claims, 1 Drawing Sheet

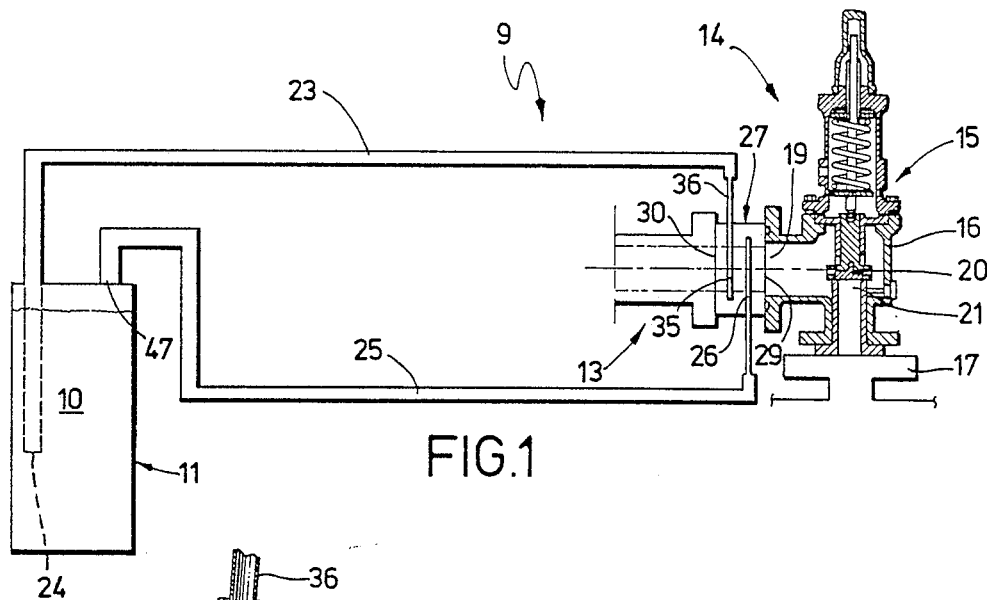
FIG.1
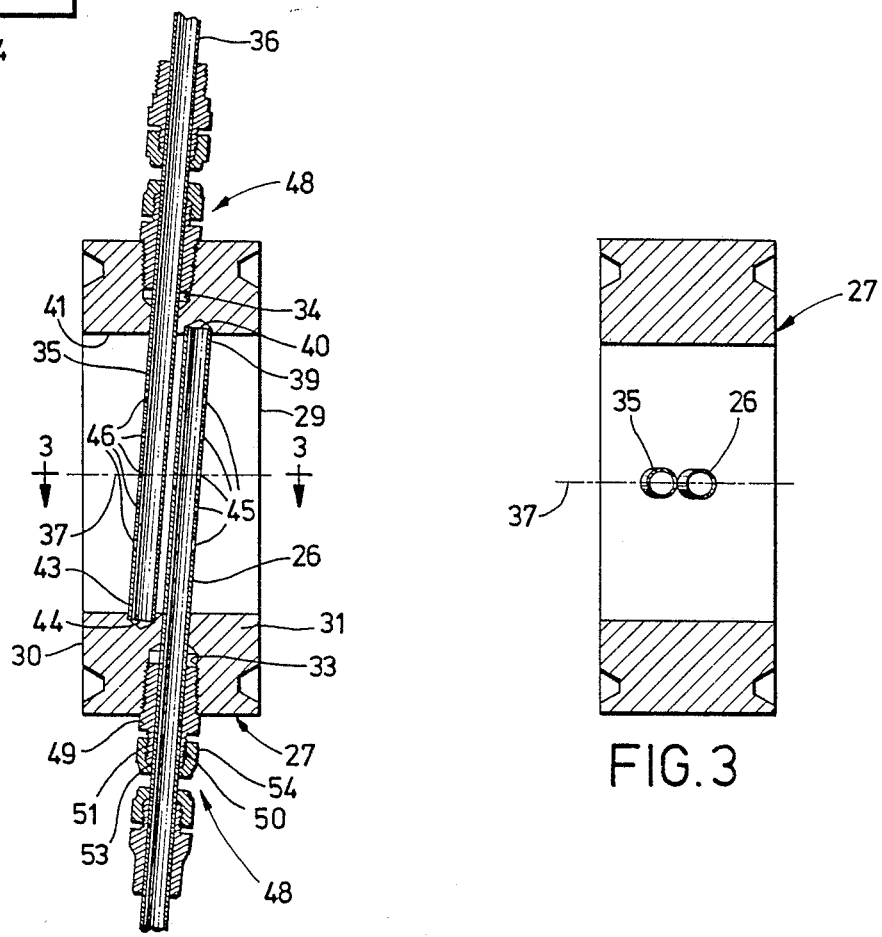
FIG.2
FIG.3

SYSTEM TO AVOID ICING IN THE DISCHARGE PIPING OF A PRESSURE RELIEF VALVE

This is a division of application U.S. Ser. No. 267,416 filed Nov. 4, 1988, now abandoned.

TECHNICAL FIELD

This invention relates generally to pressure relief systems and, more particularly, to apparatus used to keep solids, such as ice, from forming in the path of the discharge fluid from a pressure relief valve and inhibiting proper functioning of the relief valve.

BACKGROUND ART

In a pressure relief system, a substantial pressure reduction may be experienced by the discharge fluid from a pressure relief valve when the fluid is vented from the system. As a result, the temperature of this discharge fluid may be lowered below the point at which various components of the discharge fluid may form into solids. If the solids accumulate to form a blockage in the discharge piping of the system, the blockage can increase the back pressure of the discharge fluid being exhausted from the valve and thereby keep the relief valve from functioning properly. To keep the solids from forming, prior systems have used steam or electrical tracings to heat the discharge fluids from the relief valve so that the temperature of the discharge fluid is kept above the temperature at which solids may form. Alternatively, anti-solidifying agents have been used to lower the temperature at which solids can form in the discharge fluid. For example, antifreeze has been injected into the discharge fluid to keep ice from forming. However, with respect to the use of anti-solidifying agents, in pressure relief systems designed for high pressure fluids such as process gases, the mass flow of the gases discharged through the relief valve can require the anti-solidifying agent to be pumped into the stream of discharge gases at flow rates higher than that obtainable using a conventional aspirator.

Examples of lower mass flow pressurized piping systems are air braking systems as are described in U.S. Pat. Nos. 1,171,014, 1,884,092 and 1,220,336. The flow of fluid through the piping in these types of systems is used to draw antifreeze from a reservoir into the flowing fluid stream. These pressurized systems, however, handle only very small mass flows at relatively low pressure conditions in comparison to pressure relief systems.

For high pressure relief systems, some prior arrangements have used solenoid actuated pumping devices to inject the anti-solidifying agent into the discharging gas. In the latter type of system, as with systems utilizing steam or electrical tracings, energy is required from a source outside the pressure relief system itself in order to inject the anti-solidifying agent.

DISCLOSURE OF INVENTION

The present invention aims to provide a new and improved arrangement for injecting a sufficient quantity of an anti-solidifying agent into the discharge fluid from a pressure relief valve to keep solids from forming in the fluid and to do so without having to rely on energy obtained from a source outside of the pressure relief system. A related object is to accomplish the foregoing by utilizing an injection driving pressure obtained from the discharge fluid itself and, particularly a driving pressure derived from the difference between the total pressure and the reverse dynamic pressure of the discharge fluid.

A more detailed object is to obtain a high pressure for injecting the anti-solidifying agent into the discharge fluid through use of high and low pressure probes extending into the path of the discharge fluid. Specifically, the two probes communicate with a reservoir containing the anti-solidifying agent through inlet and outlet lines. The high pressure probe includes an inlet orifice facing upstream of the discharge fluid flow so that the total pressure of the discharge fluid is delivered to the reservoir through the inlet line. The low pressure probe includes an outlet orifice facing downstream of the discharge fluid flow and communicates through the outlet line to the reservoir so that the reservoir also is exposed to the reverse dynamic pressure of the discharge fluid. As a result, the anti-solidifying agent in the reservoir is driven from the reservoir through the outlet line and into the flow of discharge gas by the driving pressure existing as the difference between the total pressure and the reverse dynamic pressure.

Invention also resides in the provision of means for selectively adjusting the magnitude of the driving pressure to vary the amount of solidifying agent to be injected into the discharge fluid.

These and other objects and advantages of the present invention will become more apparent from the following description of the best mode of the invention when taken in conjunction with the accompanying drawings.

BRIEF DESCRIPTION OF DRAWINGS

FIG. 1 is a schematic view of a new and improved arrangement embodying the novel features of the present invention for injecting an anti-solidifying agent into the discharge piping from a safety relief valve in a pressurized system.

FIG. 2 is an enlarged cross-sectional view of a section of the discharge piping where the anti-solidifying agent is injected into the flow path of discharge fluid from the valve.

FIG. 3 is a cross-sectional view of the piping section taken along line 3—3 of FIG. 2.

BEST MODE FOR CARRYING OUT THE INVENTION

As shown in the drawings for purposes of illustration, the present invention is embodied in an arrangement 9 for injecting an anti-solidification agent 10 such as antifreeze from a reservoir 11 into the piping 13 of a pressurized system 14 employing a safety relief valve 15 (see FIG. 1). Herein, the valve includes a usual housing 16 shown mounted on a header 17 of a pressure vessel (not shown) with the discharge piping 13 of the system connected to the housing around an outlet 19. Within the valve, a valve closure member 20 is spring urged into a normally closed position covering a nozzle 21. When pressure within the vessel exceeds the set point of the valve the closure member shifts open for discharge gas to flow through the valve from the pressure vessel and into the discharge piping. To deliver the anti-solidification agent into the flow path of the discharged gas, an injection line 23 communicates between an outlet 24 of the reservoir 11 and the discharge piping so that as gas is discharged from the valve the anti-solidifying agent may be added to the gas stream.

In accordance with the primary aim of the present invention, a unique arrangement is provided for using the energy of the discharging gas itself to inject enough anti-solidifying agent 10 to keep solids from forming in discharge gases of the pressure relief system 14. For this purpose, an inlet pressure line 25 communicates between the discharge gas flow path and the reservoir and is exposed to the total pressure of the discharge gas when flowing. The injection line 23 also communicates with the discharge flow path but is exposed to the reverse dynamic pressure of the flowing discharge gas. In this way, anti-solidifying agent inside of the reservoir is subjected to a high driving pressure derived from the difference between the total pressure of the flowing discharge gas and its reverse dynamic pressure. Advantageously, with this driving pressure, enough anti-solidifying agent can be injected in the discharge gas to keep solids from forming even for the high mass flows experienced by pressure relief systems for process gases without having to rely on energy sources outside of the discharge gas.

More specifically, the inlet pressure line 25 communicates with the discharge gas through a tubular probe 26 mounted within a bleed ring 27 which defines a short section of the discharge piping 13 of the system. An upstream end 29 of the bleed ring is sealingly connected directly to the valve housing 16 and similarly a downstream end 30 connects to the remaining section of the discharge piping. Extending through the wall 31 of the bleed ring intermediate its ends are two probe ports 33 and 34. The two probe ports are located diametrically of each with the lower port 33 as shown in FIG. 2 receiving the inlet probe 26. Connected within the other port 34 is a second tubular probe 35 whose outer end portion 36 connects with the injection line 23 from the reservoir. The two probes extend parallel with each other completely across the path of discharge gases within the bleed ring at an angle as is shown in FIG. 2 with the inlet probe 26 inclined with respect to the central axis 37 of the ring at an acute angle upon progressing inwardly from the port 33. An inner end portion 39 of the inlet probe is seated within a recess 40 located in the inner surface 41 of the wall 31 of the bleed ring upstream of the probe port 34. Similarly, the inward end 43 of the second or injection probe 35 is seated within a recess 44 located downstream of the probe port 33. By mounting the two probes in the bleed ring in this way with the two probes also aligned longitudinally of the central axis 37 of the ring (see FIG. 3), a minimal resistance to discharge gas flow is achieved while also providing maximum material thicknesses between the probe ports and ends of the bleed ring to help insure structural integrity of the ring when subjected to high pressures.

To supply high pressure from the discharge gas to the reservoir 11, the inlet or high pressure probe 26 includes a plurality (herein five are shown), of inlet orifices 45 formed through the side wall of the probe. The orifices are spaced equally from each other along the probe within the central portion of the flow path of the discharge gas. Specifically, the inlet orifices face directly upstream relative to the discharge gas flow from the valve. Thus, when oriented in this way, the pressure to which the inside of the inlet probe and the anti-solidifying agent in the reservoir 11 are exposed is the total pressure of the discharge gas. This pressure is of course significantly higher than the static pressure of the discharge gas.

Similarly, outlet orifices 46 in the injection probe 35 are spaced equally from each other along the probe within the central portion of the flow path of the discharge gas. In contrast to the inlet orifices, however, the outlet orifices face directly downstream relative to the discharge gas flow so that the pressure to which the inside of the injection probe and the reservoir outlet 24 are exposed is the reverse dynamic pressure of the discharge gas. This latter pressure, of course, is significantly lower than the static pressure of the discharge gas.

With the outlet 24 of the reservoir 11 below the level of the anti-solidifying agent 10 (see FIG. 1), and with the reservoir otherwise closed except for the outlet being exposed to the reverse dynamic pressure and the interior of the reservoir exposed to the total pressure of the discharge gas, the resulting difference in pressure drives the anti-solidifying agent from the reservoir through the injection line 23 and into the discharging gas from the relief valve 15. As the anti-solidifying agent is driven from the reservoir its volume is replaced by discharge gas delivered to the reservoir through an inlet 47 connecting with the inlet pressure line 25. When the valve closes, the flow of gas stops and so does the injected flow of anti-solidifying agent because the two probes are then exposed to the same static pressure and no driving pressure is created.

In accordance with another important feature of the present invention, the amount of anti-solidifying agent injected into the gas piping 13 from the reservoir 11 may be adjusted selectively. For this purpose, adjustment means are provided for setting the driving pressure to be lower than the pressure difference between the total pressure and the reverse dynamic pressure of the gas flowing through the piping. By virtue of this adjustment means, the concentration of the anti-solidifying agent in the gas can be set at a minimum for the gas flow condition of the pressurized system 14 which requires the greatest concentration of agent to keep solids from forming.

In the exemplary pressure relief system 14, the greatest drop in temperature of the discharge gas occurs with the greatest drop in discharge gas pressure across the nozzle 21 of the valve 15. Using the valve specifications and system conditions, ordinary engineering techniques may be employed to determine the mass flow of discharge gas at the greatest over pressure condition expected for normal operation of the valve and the concentration of anti-solidifying agent required to keep solids from forming can then be determined. Flow of anti-solidification agent from the reservoir 11 can be determined empirically for different driving pressures. Also, the discharge gas flow at the greatest over flow condition can be simulated and applied to the injection arrangement 9 to establish an actual maximum driving pressure. Herein, adjustment of this driving pressure to some lower driving pressure is achieved by rotating the inlet probe 26 about its central axis so that the inlet orifices 45 face less directly upstream than for the maximum driving pressure. Thus, the pressure in interior of the inlet probe is reduced to a pressure less than the total pressure of the discharging gas. By selective rotation of the inlet probe between positions with the inlet orifices facing directly upstream and facing directly perpendicular to the discharge gas flow, the pressure applied to the interior inlet probe and through the inlet line 25 to the reservoir may be selectively varied between the total and static pressures of the discharging gas to thereby selectively adjust flow of the anti-solidification agent from the reservoir.

To releasably secure the inlet probe 26 within the bleed ring 27, a connector 48 includes an externally threaded body 49 secured within the probe port 33. The inlet probe is telescoped through the body and extends into the ring. Integrally formed with and extending axially outward from the body is a gripping member 50 having external threads 51 and a tapered outer end portion 53. To lock the probe onto the body, an internally threaded cap 54 is tightened onto the external threads 51 of the gripping member and a matching tapered section within the cap engages the tapered portion 53 and wedges the gripping member against the probe locking the latter in the position selected. To reposition the probe, the cap is threaded loose from its locked position for the gripping member to release the probe allowing it to be rotated into a different position.

As shown in FIG. 2, the injection probe 35 is mounted in the bleed ring in an identical fashion to the inlet probe mounting, wherein like parts of another connector 48 are identified by the same reference numbers. It will be appreciated that while adjustment in the driving pressure has been described as being achieved by selectively positioning the inlet probe 26, driving pressure adjustment also may be accomplished by repositioning the injection probe with the outlet orifices 46 oriented in position between facing directly downstream or directly perpendicular to the discharge gas flow. In this way, the pressure applied to the agent at the outlet orifices can be varied between the lowest possible reverse dynamic pressure and the static pressure of the gas to vary the driving pressure. Still other ways of varying the driving pressure are possible such as by employing a variable flow restrictor in the inlet line 25.

As another alternate feature of the present invention, the collection of solids on the high pressure probe 26 may be avoided by locating the injection probe 35 upstream of the high pressure probe 26. In this way, anti-solidifying agent is discharged into the gas to lower the temperature at which solids may form before the gas impinges the high pressure probe.

While the present invention has been described as incorporated in an arrangement 9 particularly suited to keep solids from forming in the discharge gas of the pressure relief system 14 wherein the gas is limited to flowing in one direction, in an alternative version (not shown) wherein the gas may flow from either direction, the injection of liquid from the reservoir 11 may be accomplished using either of the two probes as the liquid injecting probe. In this version, the probes are positioned as described earlier relative to each other wherein the orifices of one probe face in a longitudinal direction opposite to the direction which the orifices in the other probe face. However, in the reservoir, the ends of the lines connecting to the probes both terminate below the level of the liquid. As a result, depending upon the direction of gas flow, the probe with orifices facing downstream always will serve as the injection probe.

What is claimed is:

1. A member flow-connectable with the piping of a discharge fluid flow system, said member comprising spaced apart upstream and downstream ends connected together by a generally cylindrical wall to define a flow path for fluid through said system, first and second probe ports substantially diametrically spaced from each other and extending through said wall, a first tubular probe mounted within said first probe port and having an inner end portion extending substantially across said flow path in a non-perpendicular direction relative to the central axis of said member, said inner end portion having a plurality of inlet orifices opening from one side thereof and facing at least partially toward said upstream end of said member to communicate a high fluid flow pressure in said flow path to the interior of said first probe, a second similar probe mounted within said second probe port and having an inward end portion extending substantially across said flow path in a non-perpendicular direction relative to the central axis of said member, said inward end portion having a plurality of outlet orifices opening from one side thereof and facing at least partially toward said downstream end of said member to communicate a low fluid flow pressure lower than said high fluid flow pressure in said flow path to the interior of said second probe, said first and second probes having outer ends connectable to a source of anti-solidifying fluid pressurizable by a driving pressure derived from the difference between said high and low pressures to drive said anti-solidifying fluid from said source, through said second probe and into the flow path of the discharge fluid flowing through said member, and connector means securing one of said probes to said member for selectively orienting the direction which the orifices of said one probe face between a first position facing in a generally longitudinal direction relative to said flow path and a second position facing in a generally perpendicular direction relative to said flow path to thereby selectively set said driving pressure at a value less than the maximum discharge fluid flow pressure difference obtainable between said first and second probes.

2. A member flow connectable with the piping of a fluid flow system, said member having spaced apart upstream and downstream ends connected together by a wall to define a flow path for fluid in said system, first and second probe ports extending through said wall, a first tubular probe mountable within one of said probe ports with an inner end portion of said probe extending through said wall and into said flow path, said inner end portion having at least one inlet orifice opening through the side thereof with said first probe oriented to face said orifice to open at least partially toward said upstream end of said member to communicate a high fluid flow pressure in said flow path to the interior of said first probe, a second similar tubular probe mountable within the other of said probe ports with an outlet orifice opening from the side of the inner end portion thereof and at least partially facing toward said downstream end so as to communicate a fluid flow pressure lower than said high fluid flow pressure in said flow path to the interior of said second probe, and said first and second probes having outer ends connectable to a source of anti-solidifying fluid pressurizable by a driving pressure derived from the fluid flow pressure difference between said probes to drive said anti-solidifying fluid from said source through said second probe and into the flow path of said fluid flowing through said system, and adjustment means for selectively setting said driving pressure at a value less than the maximum fluid flow pressure difference obtainable between said first and second probes, said adjustment means including a first releasable connector for securing one of said probes to said wall, said connector being movable between a locked position securing said one probe in a selected position against movement within said member and a release position allowing said one probe to be moved within said member to vary the angular orientation of said orifice of said one probe selectively between a first position facing in a longitudinal direction relative to said flow path to and a second direction facing perpendicular relative to said flow path.

3. A member flow connectable with the piping of a fluid flow system, said member having spaced apart upstream and downstream ends connected together by a wall to define a flow path for fluid in said system, first and second probe ports extending through said wall, a first tubular probe mountable within one of said probe ports with an inner end portion of said probe extending through said wall and into said flow path, said inner end portion having at least one inlet orifice opening through the side thereof with said first probe oriented to face said orifice to open at least partially toward said upstream end of said member to communicate a high fluid flow pressure in said flow path to the interior of said first probe, a second similar tubular probe mountable within the other of said probe ports with an outlet orifice opening from the side of the inner end portion thereof and at least partially facing toward said downstream end so as to communicate a fluid flow pressure lower than said high fluid flow pressure in said flow path to the interior of said second probe, and said first and second probes having outer ends connectable to a source of anti-solidifying fluid pressurizable by a driving pressure derived from the fluid flow pressure difference between said probes to drive said anti-solidifying fluid from said source through said second probe and into the flow path of said fluid flowing through said system and said wall being generally cylindrical in shape and said first and second probe ports being formed through said wall substantially diametrically opposite of each other.

4. A member flow connectable with the piping of a fluid flow system, said member having spaced apart upstream and downstream ends connected together by a wall to define a flow path for fluid in said system, first and second probe ports extending through said wall, a first tubular probe mountable within one of said probe ports with an inner end portion of said probe extending through said wall and into said flow path, said inner end portion having at least one inlet orifice opening through the side thereof with said first probe oriented to face said orifice to open at least partially toward said upstream end of said member to communicate a high fluid flow pressure in said flow path to the interior of said first probe, a second similar tubular probe mountable within the other of said probe ports with an outlet orifice opening from the side of the inner end portion thereof and at least partially facing toward said downstream end so as to communicate a fluid flow pressure lower than said high fluid flow pressure in said flow path to the interior of said second probe, and said first and second probes having outer ends connectable to a source of anti-solidifying fluid pressurizable by a driving pressure derived from the fluid flow pressure difference between said probes to drive said anti-solidifying fluid from said source through said second probe and into the flow path of said fluid flowing through said system and said flow path having a central longitudinal axis and said first and second probes extend into said flow path substantially parallel to each other and in a non-perpendicular direction generally intersecting said central longitudinal axis of said flow path.

5. A member flow connectable with the piping of a fluid flow system, said member having spaced apart upstream and downstream ends connected together by a wall to define a flow path for fluid in said system, first and second probe ports extending through said wall, a first tubular probe mountable within one of said probe ports with an inner end portion of said probe extending through said wall and into said flow path, said inner end portion having at least one inlet orifice opening through the side thereof with said first probe oriented to face said orifice to open at least partially toward said upstream end of said member to communicate a high fluid flow pressure in said flow path to the interior of said first probe, a second similar tubular probe mountable within the other of said probe ports with an outlet orifice opening from the side of the inner end portion thereof and at least partially facing toward said downstream end so as to communicate a fluid flow pressure lower than said high fluid flow pressure in said flow path to the interior of said second probe, and said first and second probes having outer ends connectable to a source of anti-solidifying fluid pressurizable by a driving pressure derived from the fluid flow pressure difference between said probes to drive said anti-solidifying fluid from said source through said second probe and into the flow path of said fluid flowing through said system and said wall including an inner surface and a recess formed in said inner surface adjacent each of said probe ports, said first probe having an inner end seated within said recess adjacent said second probe port and said second probe having an inner end seated within said recess adjacent said first probe port.

6. A member flow connectable with the piping of a fluid flow system, said member having spaced apart upstream and downstream ends connected together by a wall to define a flow path for fluid in said system, first and second probe ports extending through said wall, a first tubular probe mountable within one of said probe ports with an inner end portion of said probe extending through said wall and into said flow path, said inner end portion having at least one inlet orifice opening through the side thereof with said first probe oriented to face said orifice to open at least partially toward said upstream end of said member to communicate a high fluid flow pressure in said flow path to the interior of said first probe, a second similar tubular probe mountable within the other of said probe ports with an outlet orifice opening from the side of the inner end portion thereof and at least partially facing toward said downstream end so as to communicate a fluid flow pressure lower than said high fluid flow pressure in said flow path to the interior of said second probe, and said first and second probes having outer ends connectable to a source of anti-solidifying fluid pressurizable by a driving pressure derived from the fluid flow pressure difference between said probes to drive said anti-solidifying fluid from said source through said second probe and into the flow path of said fluid flowing through said system and each of said probes including a plurality of said orifices axially spaced from each other along said probe, each of said orifices on said probe facing in the same direction.

7. A member flow connectable with the piping of a fluid flow system, said member having spaced apart upstream and downstream ends connected together by a wall to define a flow path for fluid in said system, first and second probe ports extending through said wall, a first tubular probe mountable within one of said probe ports with an inner end portion of said probe extending through said wall and into said flow path, said inner end portion having at least one inlet orifice opening through the side thereof with said first probe oriented to face said orifice to open at least partially toward said upstream end of said member to communicate a high fluid flow pressure in said flow path to the interior of said first probe, a second similar tubular probe mountable within the other of said probe ports with an outlet orifice opening from the side of the inner end portion thereof and at least partially facing toward said downstream end so as to communicate a fluid flow pressure lower than said high fluid flow pressure in said flow path to the interior of said second probe, and said first and second probes having outer ends connectable to a source of anti-solidifying fluid pressurizable by a driving pressure derived from the fluid flow pressure difference between said probes to drive said anti-solidifying fluid from said source through said second probe and into the flow path of said fluid flowing through said system and said inlet orifice being located in said flow path downstream of said outlet orifice.

* * * * *